US005559895A

United States Patent [19]
Lee et al.

[11] Patent Number: 5,559,895
[45] Date of Patent: Sep. 24, 1996

[54] ADAPTIVE METHOD AND SYSTEM FOR REAL TIME VERIFICATION OF DYNAMIC HUMAN SIGNATURES

[75] Inventors: Luan L. Lee; Toby Berger, both of Ithaca, N.Y.

[73] Assignee: Cornell Research Foundation, Inc., Ithaca, N.Y.

[21] Appl. No.: 790,965

[22] Filed: Nov. 8, 1991

[51] Int. Cl.$^6$ .................................................. G06K 9/00
[52] U.S. Cl. .................................... 382/119; 382/159
[58] Field of Search ................................. 382/3, 13, 16, 382/30, 34, 119, 159, 160, 190, 209, 218; 348/161; 178/18; 340/825.3, 825.33, 825.34

[56] References Cited

U.S. PATENT DOCUMENTS

| | | | |
|---|---|---|---|
| 3,956,734 | 5/1976 | Radcliffe, Jr. | 340/146.3 SY |
| 4,028,674 | 6/1977 | Chuang | 340/146.3 SY |
| 4,308,522 | 12/1981 | Paganini et al. | 382/3 |
| 4,646,351 | 2/1987 | Asbo et al. | 382/3 |
| 4,752,965 | 6/1988 | Dunkley et al. | 382/3 |
| 5,005,205 | 4/1991 | Ellozy et al. | 382/3 |
| 5,042,073 | 8/1991 | Collot et al. | 382/3 |
| 5,109,426 | 4/1992 | Parks | 382/3 |
| 5,251,265 | 10/1993 | Döhle et al. | 382/3 |

OTHER PUBLICATIONS

M. Achemlal et al., "Dynamic Signature Verification", *Security and Protection in Information Systems*, Proceedings 4th IFIP TC 11 International Conference on Computer Security, Monte Carlo, 1986, pp. 381–389.

Beatson, "Signature Dynamics in Personal Identification" Signify, McCorquodale House, Basingstoke, Hampshire, England.

Liu, "Reference Design Procedure for Signature Verification," IBM Technical Disclosure Bulletin, vol. 21, No. 1, Jun. 1978, pp. 426–427.

*Primary Examiner*—Leo Boudreau
*Assistant Examiner*—Andrew W. Johns
*Attorney, Agent, or Firm*—Salzman & Levy

[57] ABSTRACT

The adaptive dynamic signature verification system of the invention includes a number of types of signature verification terminals which digitize signatures for further verification by statistical analysis. A feature set is employed that consists of a number of personalized features, some static and some dynamic, each of which is normalized with respect to both time and spatial dimensions and allows for a degree of inconsistency in both speed and size of genuine signatures without losing the ability to discriminate against forgery attempts. The statistical approach also develops and employs either an individual-specific or a common feature subset for accurate signature discrimination.

16 Claims, 12 Drawing Sheets

SIGNATURE VERIFICATION 11

POINT OF SALE VERIFICATION SYSTEM 1

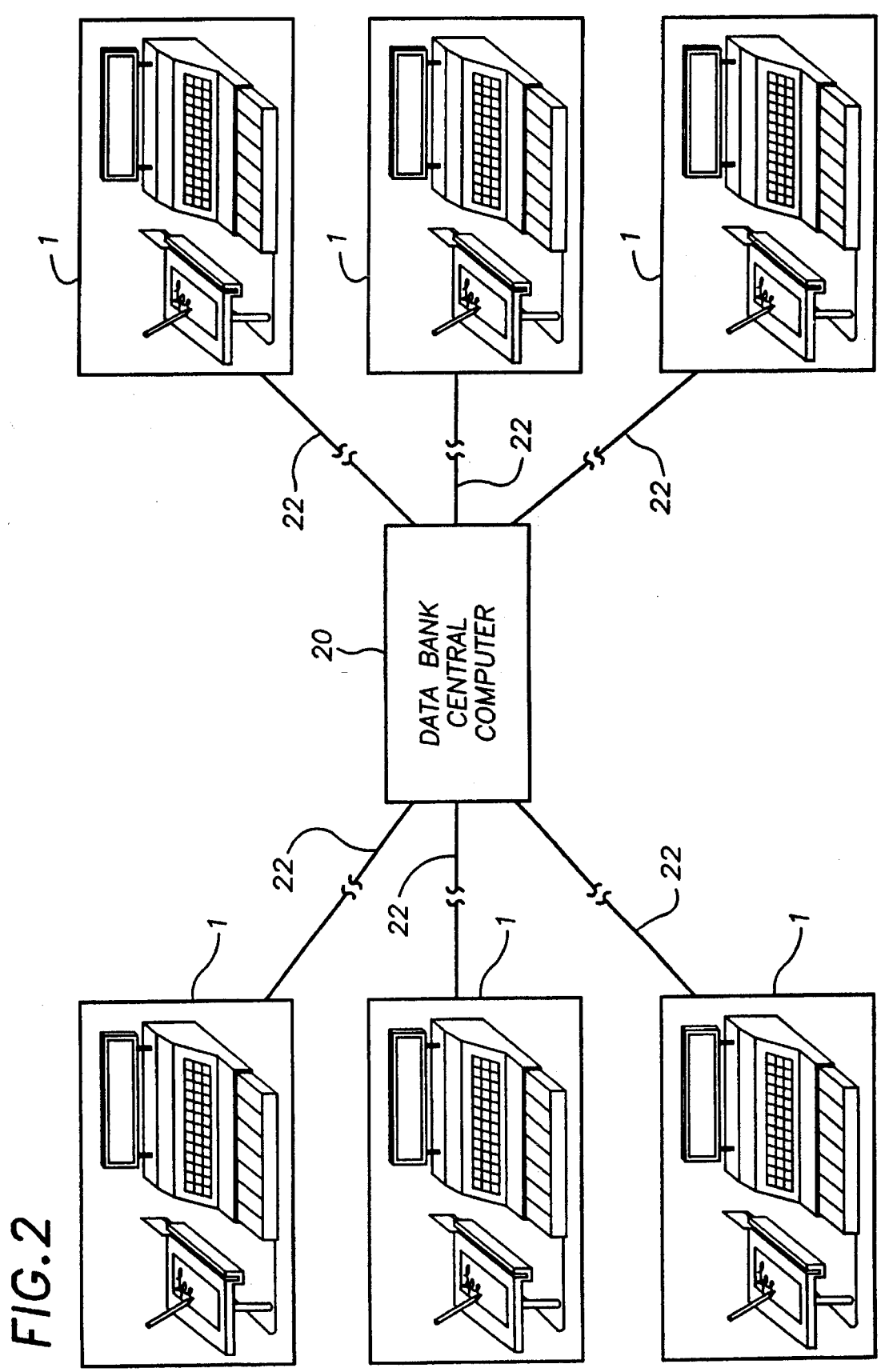

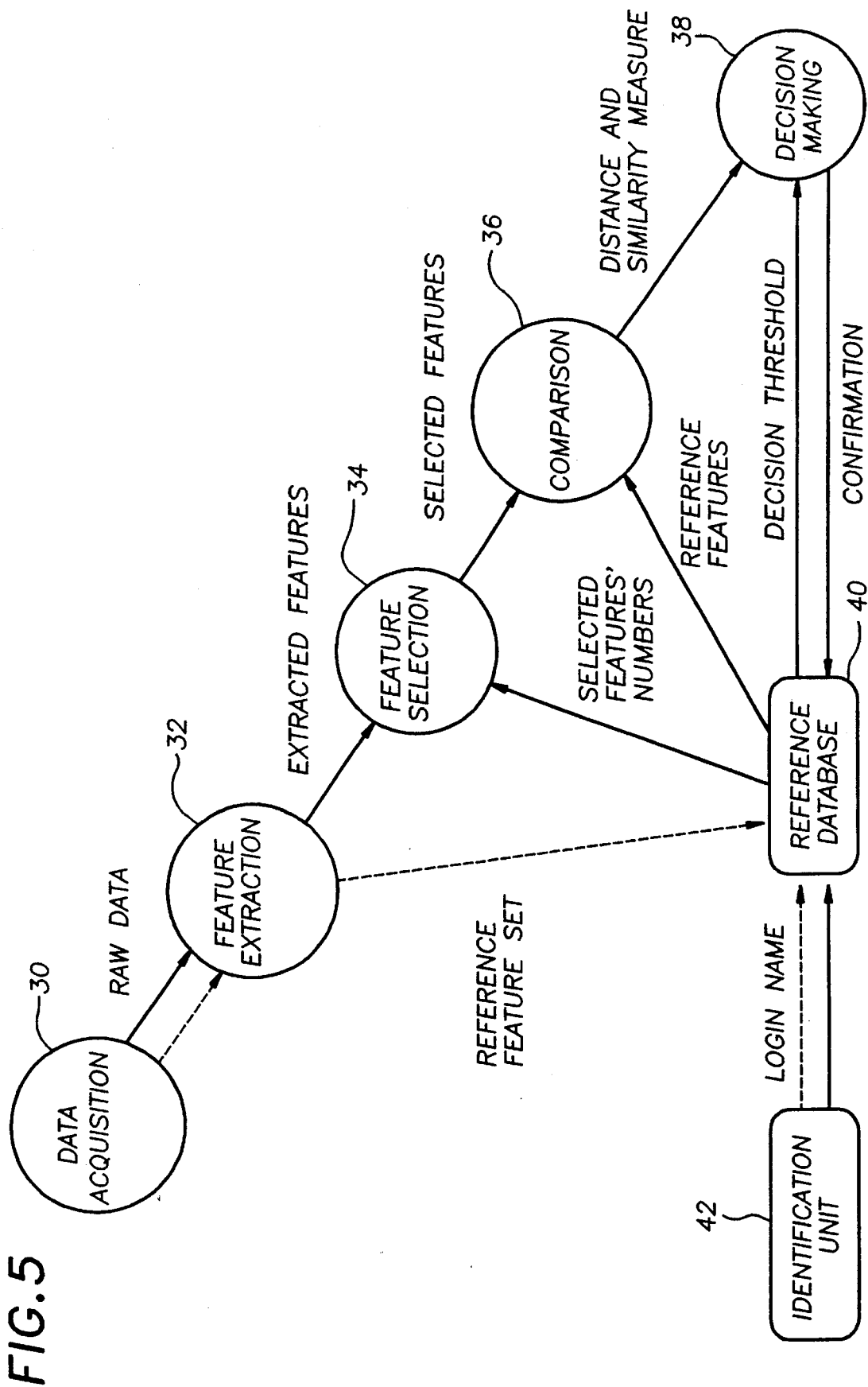

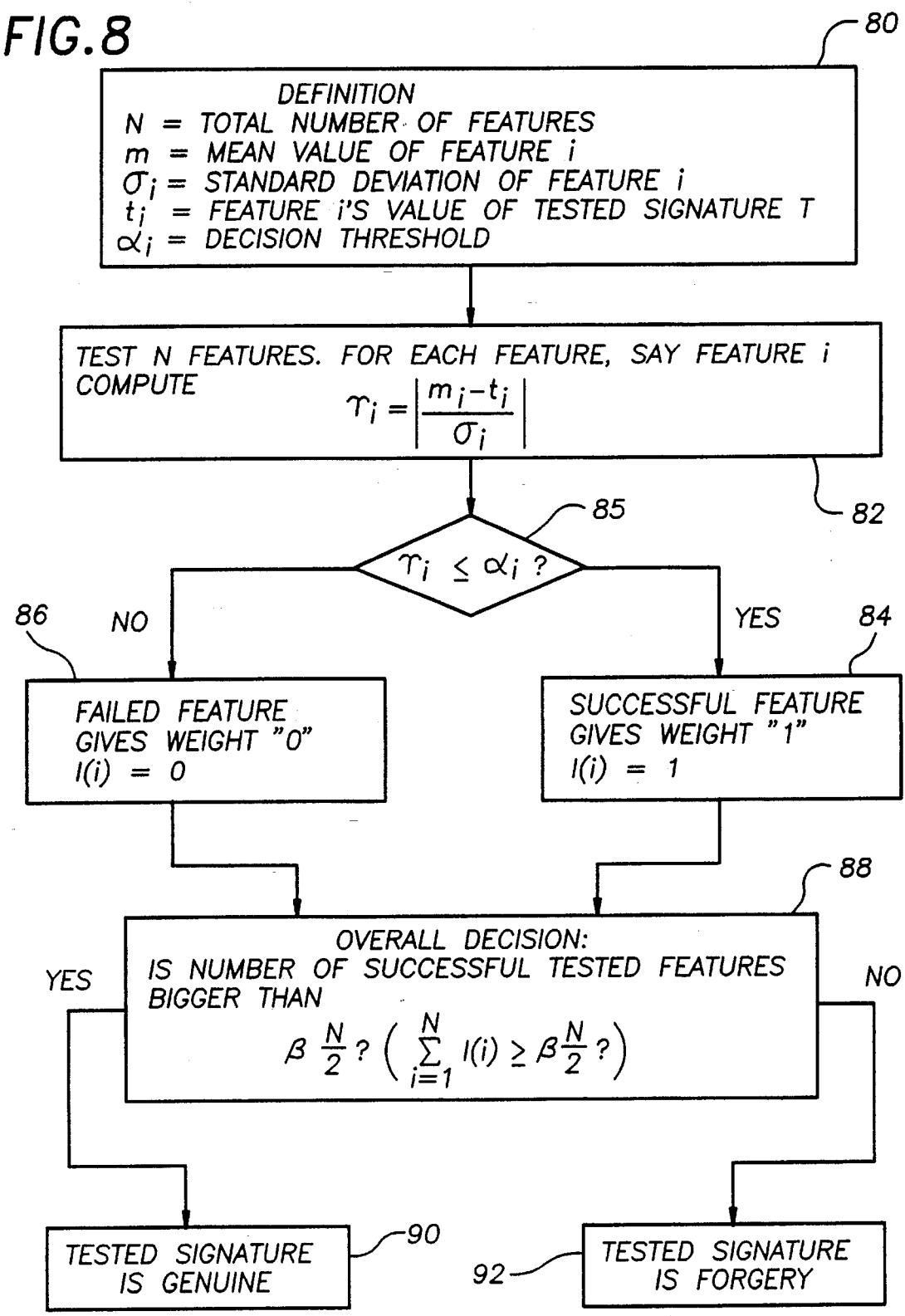

A — PERFORMANCE USING INDIVIDUALIZED FEATURE SET.
B — PERFORMANCE USING COMMON FEATURE SET OF SIZE 10.

ADAPTIVE METHOD AND SYSTEM FOR REAL TIME VERIFICATION OF DYNAMIC HUMAN SIGNATURES

FIELD OF THE INVENTION

This invention relates to a method and system for signature recognition and verification, and more particularly to an adaptive method and system for first digitizing a currently applied hand written signature of a candidate seeking identity verification; thereafter, calculating values for a set of features derived from the digitized data; performing a comparison of such data with the feature values of a stored set of features derived from the candidate's signature on file; and thereafter, providing a verification or rejection of the candidate's current signature.

BACKGROUND OF THE INVENTION

Today, methods of personal identification are generally not reliable, as evidenced by the abundance of credit frauds. The possession of an identification or credit card alone will often verify the holder as a valid credit risk. The presentation of a credit card with a hastily inscribed signature is usually adequate to authenticate a credit transaction. The use of an Automatic Teller Machine (ATM) card with a Personal Identification Number (PIN) permits withdrawal of money from the bank despite the possibility that both may have been purloined.

A signature alone or a signature in conjunction with the presentation of a credit card or a driver's license is usually sufficient for obtaining credit in commercial establishments. The signature of the individual is rarely questioned, and very often it is not even scrutinized. Business is often transacted by relatively junior personnel having a minimum of experience in recognizing fraud. A business may have a customer's signature on file, but it is seldom referred to, or even visually compared with the current signature by the clerk processing the transaction.

Current methods of identification are obviously insufficient for their intended purpose. It is all too easy to falsify an identity, or obtain a valid credit card belonging to someone else. Forgeries are commonplace, and improper transactions are easily consummated.

The abundance of "white collar" crimes, which has increased the cost of doing business, necessitates the need for stricter signature or credit verification.

DISCUSSION OF RELATED ART

Certain patents have issued offering partial solutions to the aforementioned problem. In U.S. Pat. No. 3,956,734, entitled "Platen Having a Pressure Transducing Means for Use in a Signature-Identifying System" a platen is described for measuring the pressure variations that the pen exerts when a signature is drawn.

U.S. Pat. No. 4,028,674, entitled "Automated Signature System", illustrates a system in which an image mosaic of a signature to be verified is stored in a memory. This mosaic is compared with a current signature mosaic. Selected features of both signatures are assigned weighted values, and a comparison is made of the various weighted features in order to verify the authenticity of the current signature.

In U.S. Pat. No. 4,752,965, entitled "Sign Verification", a self-contained portable writing pad unit is featured for determining data relating to an original signature. Unfortunately, this reference requires a double mechanical insertion of a credit card or other authorization device. To the reader's detriment, this system lacks description of the details of how signature comparisons are made, or how data acquisition is accomplished. Moreover, it discloses only a single calculation of total signing time and length of time the writing implement contacts the pad unit.

A study entitled "Signature Dynamics in Personal Identification", published by Rodney Beatson of Signify, McCorquodale House, Basingstoke, Hampshire, United Kingdom, describes the "Sign/on Signature Verification" system of Signify, Inc. The system uses a wired pen with an energized coil coupled to X,Y secondary coils beneath the writing surface. This allows the system to capture the signature continuity as well as the movement off the paper.

SUMMARY OF THE INVENTION

The invention is for a method and system for real-time, adaptive, signature verification. The system includes at least one, and preferably a number of signature verification terminals. Each terminal converts signatures into digitized data, which is compared with stored, digitized signature data. The data is arranged according to a set of feature vectors, which can be normalized with respect to both time and spatial dimensions. This normalization provides reliability in discriminating a true signature from a forgery, despite the fact that individual signatures will change with time. The system has the capability of discriminating between the degrees of inconsistency in both speed and size of genuine signatures with that stored in memory.

Typical input terminals utilizing the inventive method and system include Point Of Sale systems having a signature verification capability. The processing of the signature of such POS systems can be activated by the insertion of a credit or debit card, or the keying-in on a register or keyboard of a PIN number.

Another variation of the invention comprises a terminal that can be connected either directly to a personal computer or, as in the case of automatic teller machines (ATMs), through a network to a central computer.

Each writing pad of the inventive system features a graphics digitizer which converts the continuous lines of the signature into digitized dots. The digitized dots are then located with respect to a coordinate system, and horizontal and vertical coordinates are assigned to each dot. The dots are also assigned values with respect to time. The resulting data represent the simultaneous accumulation of both static and dynamic information. These data are used to calculate each feature of a set of features characterizing the signature. The database used to compare the current signature for the signatory (the person making the signature) consists of a mean and a standard deviation for each feature of the set. Of course, it is to be understood that other mathematical differences can be calculated, and that the mean and standard deviation are utilized herein only because of their convenience as a particular mathematical tool in providing difference information.

For each feature in a set of features of the signature specially selected for an individual signatory, the difference between the value of that feature for the signature being tested and the mean value of that feature for signatures of that individual known to be genuine is computed. The set contains these features for which the statistically most significant differences exist between the feature's average value for genuine signatures and for forgeries for the signatory in question. A majority decision algorithm weights each feature in the subset and, if at least a predetermined proportion (e.g., half) of the ranked feature differences pass, then the signature is declared genuine. The genuine signature is then included in the database, thereby updating the signatory's latest signature in the data bank. In this manner, the system adjusts to changes in the signature characteristics over time. In other words, the information in the database continues to evolve, and the system is adaptive.

Accordingly, it is an object of the invention to provide an improved signature verification system with improved reliability and decreased cost.

It is another object of the invention to provide an adaptive signature verification system that adjusts for changes in the signature of an individual with time.

It is yet another object of the invention to have a system for verifying signatures featuring an extensive feature set of signature data values in which both static and dynamic data are captured simultaneously.

BRIEF DESCRIPTION OF THE DRAWINGS

These and other objects of the invention will be better understood with reference to the subsequent detailed description considered in conjunction with the accompanying drawings, in which:

FIG. 2 shows a schematic view of a network of Point Of Sale registers connected to a central computer over a communication line in accordance with the present invention;

FIG. 5 illustrates a diagrammatical view of the On-Line Signature Verification System;

FIG. 8 shows a flow chart of the adaptive majority decision algorithm utilized in the method of this invention;

DESCRIPTION OF THE PREFERRED EMBODIMENT

Generally speaking, the invention features a method and system for signature verification. The method and system of the invention use a personal computer or an electronic cash register in conjunction with a graphic digitizer. These standard components offer an ideal solution to the signature verification problem, since they are low cost, reliable and accurate. The commonality of these components make them ideal for commercial transactions, since most trading establishments already possess personal computers or electronic cash registers, or they can easily afford to purchase them.

The design and implementation of a real-time signature verification system requires the solution to the following basic problems: (a) data acquisition, (b) feature extraction, (c) feature selection, (d) decision making, and (e) performance evaluation.

To be operationally viable, a Point Of Sale (POS) signature verification system requires real-time response, simplicity, low cost, an extremely low Type I error rate (false rejection of a genuine signature), and moderate Type II error rate (false acceptance of a forgery). Ideally, the signature verification system can be interfaced with an accounting system located downstream of the POS system. The accounting system must be capable of both debiting and crediting the sales operations.

Figure 1A:
FIG. 1a shows a schematic view of a graphics digitizer operating with a personal computer in accordance with the present invention.
Figure 1B:
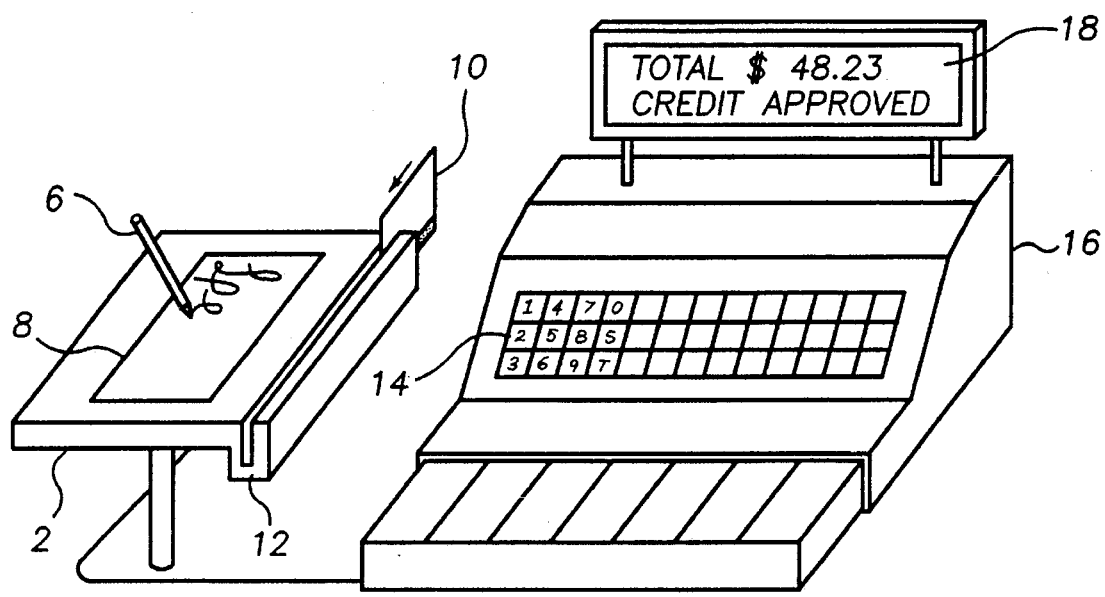
FIG. 1b illustrates a schematic view of a graphics digitizer operating with a Point Of Sale register in accordance with the present invention.
Figure 1C:
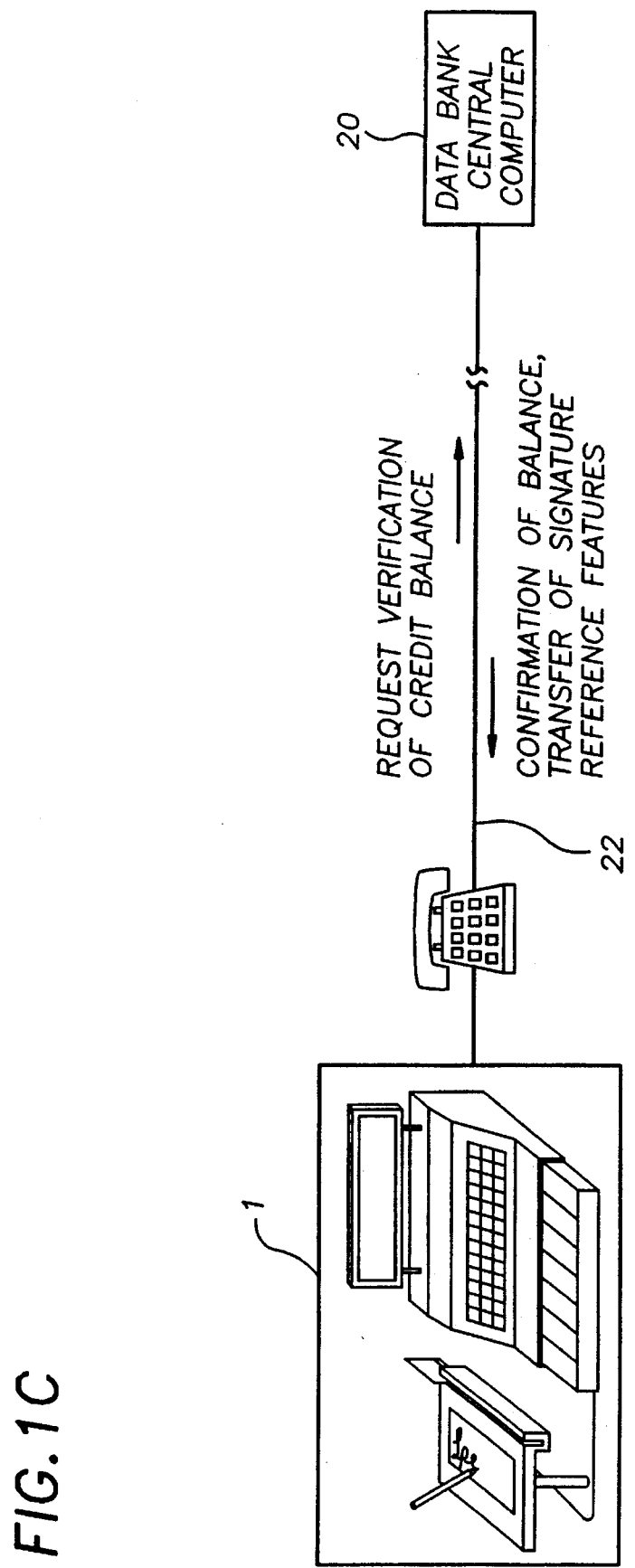
FIG. 1c depicts a schematic view of a graphics digitizer operating with a central computer over a communication line in accordance with the current invention.
Figure 3:
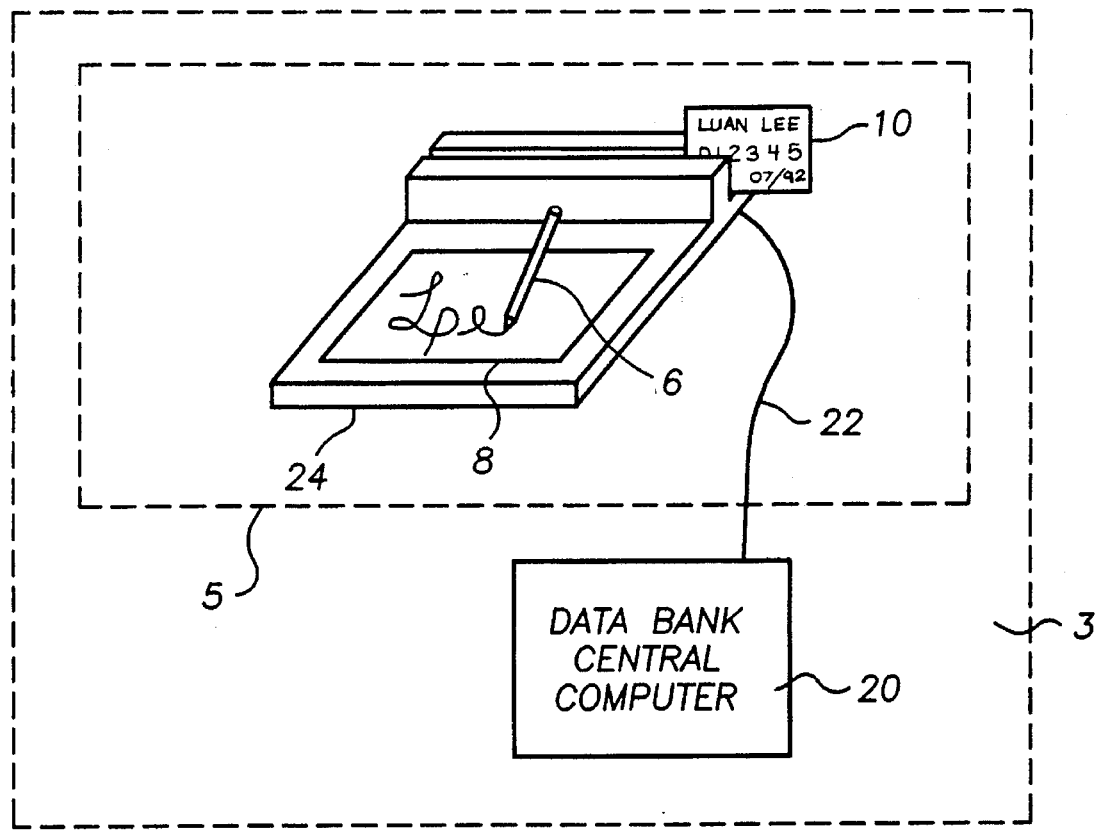
FIG. 3 illustrates a schematic view of a portable signature verification unit for use in the current invention.

FIGS. 1a, 1b and 1c show several system configurations in accordance with the invention that are configured to provide local personal signature identification; FIG. 2 depicts a system configured to provide a remote personal signature identification in accordance with the invention; and FIG. 3 shows a portable signature acquisition system utilizing the inventive method.

Referring to FIG. 1a, a typical signature verification system 11 of this invention includes a graphics digitizer 2 coupled to a personal computer (PC) 4 or its equivalent. The computer 4 and graphics digitizer 2 are all that is needed for simple POS applications. The commercially available graphics digitizer 2, typically manufactured by ALPS Electric USA Corp. in the preferred embodiment, provides the spatial information about sample points on a sheet 8, upon which a writing implement 6 passes during the signing process. The writing implement 6 could be any stylus or writing instrument, including an ordinary pen or pencil.

The digitizer provides precise timing information with respect to the signature being formed. This information is processed in the PC 4. Data are transferred from the digitizer 2 to the PC 4 at typically 9600 bits per second.

Algorithm design, analysis, implementation and simulation are all accomplished by the PC 4, as will be hereinafter explained with respect to the description of the inventive method. A PC 4 that uses an Intel 80386 processor would provide less than a 1.5 second response time in the signature verification process of this invention. Using special purpose hardware and/or parallelism in the algorithm would make this response even faster.

In FIG. 1b, at a POS or commercial trade facility 1, a customer places a credit card or "smart card" 10 into a card reader 12, or keys a personal identification number (PIN) into keyboard 14 of an electronic sales register 16 for purposes of summoning certain information about genuine signatures of the person in question from the computer memory. This information will be used to compare the current signature with the signature of the customer that is already on file. Using writing implement 6, the customer writes his or her signature on pad 8 of graphics digitizer 2. The digitized signature is analyzed by logic in register 16 and a response is displayed on panel 18.

Referring to FIG. 1c, the POS verification system 1 of FIG. 1b communicates with data bank central computer 20 over communication line 22. The signature reference features are stored in computer 20 and sent to the local POS system 1 in response to a card 10 and/or PIN. The local POS system 1 verifies the signature and confirms the transaction.

In FIG. 2, computer 20 receives the digitized signature or a set of features extracted from the signature, as well as the transaction record from POS system 1. Computer 20 verifies the signature and sends the transaction record back to the sending POS system 1.

Referring to FIG. 3, a signature acquisition system 3 includes a portable signature acquisition unit 5 connected to a computer 20. Unit 5 includes a battery activated tablet 24, the reader 12 for reading card 10 and the writing implement 6 for writing signatures on pad 8. The tablet 24 includes the digitizer 2 and either sufficient logic to implement the feature extraction algorithm and store the results or sufficient storage to record the raw data (x, y and t values) for many signatures gathered sequentially from a succession of customers. Periodically unit 5 is connected to computer 20 for transfer of the information stored in tablet 24. If an immediate verification of a particular transaction is required, then the unit 5 may be connected to computer 20 via communication line 22 or perhaps through an electronic cash register.

Figure 3A:
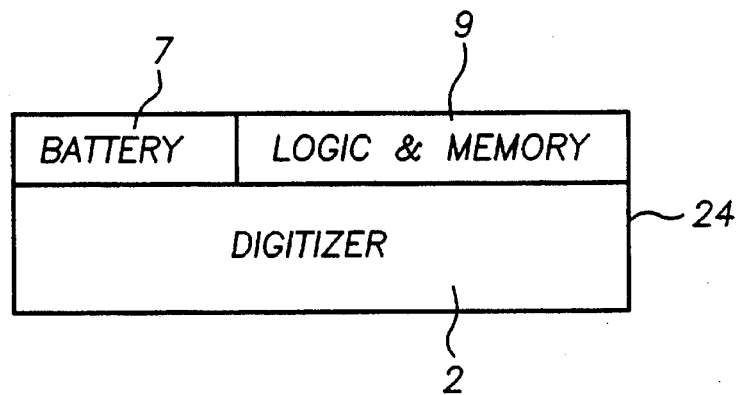
FIG. 3a depicts a schematic view of the elements of the tablet of the portable signature verification unit of FIG. 3.

FIG. 3a illustrates the elements of tablet 24 which include a battery pack 7, logic and memory 9, and the digitizer 2.

Figure 4E:
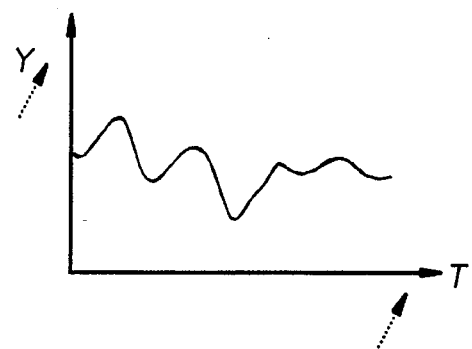
FIGS. 4a through 4e show various graphs of the horizontal and vertical coordinates of the digitized signature with respect to time.
Figures 4A, 4B:
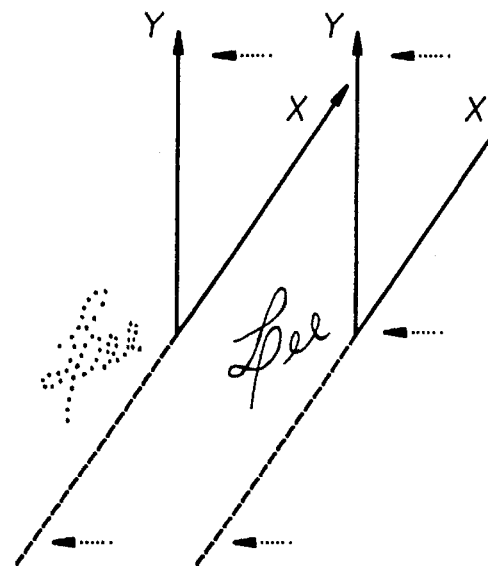

Referring to FIG. 4a, a projection of a static signature in a horizontal (X), vertical (Y) plane, is shown.

FIG. 4b illustrates a digitized sample in the X,Y plane of the static signature depicted in FIG. 4a. The coordinates of each digitized point are used in feature set calculations. The digitized points are typically stored at the rate of 100 sample points per second. The data is transferred when the writing implement 6 is in contact with the digitizer 2. Data are not transferred when the writing implement 6 is raised even momentarily. However, the amount of time the implement 6 is not in contact with the digitizer 2 is measured by a software routine of the computer.

Figure 4C:
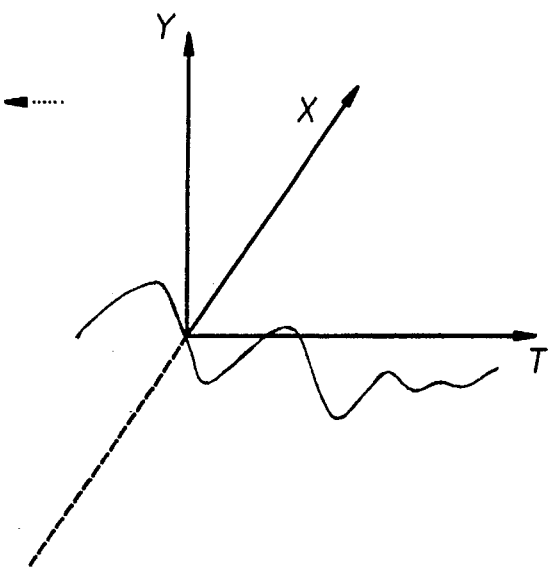

FIG. 4c illustrates a representative sample of the dynamic signature as a curve in 3-dimensional space in relation to the X, Y, and T (time) axes. The sample points are shown interconnected for clarity.

Figure 4D:
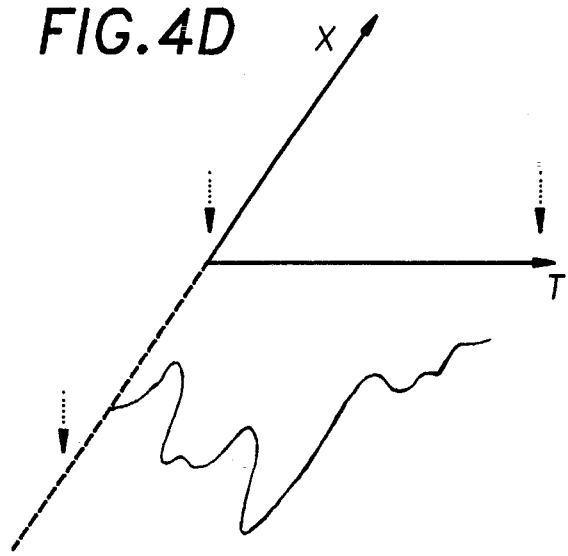

Referring to FIG. 4d, a projection of the signature in the 2-dimensional X, T plane is shown.

In FIG. 4e, a projection of the signature in the 2-dimensional Y, T plane is illustrated.

FIG. 5 depicts a diagram of the overall, real-time signature verification process of the invention. The process includes two phases. The first phase develops a database for each signatory using both genuine and forged signatures, if the latter are available. The second phase verifies each subsequent signature and uses data derived from the new signature to update the database. In this manner the system is continually and gradually updated. This part of the process is important, since it is well known that signatures of most, if not all, signatories will change over time.

During the pre-verification, or reference data base compiling phase of the process, an identification unit 42, consisting of the aforementioned digitizer and computer, communicates with a reference database 40 stored in memory. First, signature data acquisition 30 is achieved by the digitizing of the signature. Then the computer extracts certain features of the digitized signature data 32. This information is used to update the memory database for the particular signatory. The identification unit 42 may also include a means for further identifying the signatory, which identification could include a keyboard for typing in the signatory's name, or a magnetic strip reader for reading the identification information stored on a credit card, or a keyboard for the inclusion of a PIN number. In either case, this further identification of the signatory is used to generate an address for accessing the signature information stored in a block of memory in the reference database 40. The memory also contains the feature calculations pertaining to the signature.

A number of signatures is originally collected from the signatory for storage in the reference database 40. Each signature is digitized as shown in FIG. 4b. The digitizing process converts the lines of the signature into an ordered series of dots, each having a horizontal (X) coordinate, a vertical (Y) coordinate, and a time (T) coordinate. Calculations based upon the digitized information are then made for each of 49 separate signature features of the feature set, shown in Table 1 below.

TABLE 1

Feature Vector Formulas $dx = Xmax - Xmin$
$dy = Ymax - Ymin$
tx = total absolute shift in x direction when pen-down
ty = total absolute shift in y direction when pen-down 1. Ratio between writing time and signature time.
2. Ratio between the instance of Vmax and writing time
3. Ratio between average writing velocity and maximum writing velocity
4. Ratio between duration of positive writing Vx and writing time
5. RAtio between duration of negative writing Vx and writing time
6. Ratio between duration of positive writing Vy and writing time
7. Ratio between duration of negative writing Vy and writing time
8. Ratio between duration of positive Vx in pen-up and total pen up time
9. Ratio between duration of negative Vx in pen-up and total pen up time
10. Ratio between duration of positive Vy in pen-up and total pen up time
11. Ratio between duration of negative Vy in pen-up and total pen up time
12. Normalized initial direction of signature (dx/dy).
13. Normalized direction of a straight line between the initial of first component and the inital of second component (dx/dy).
14. Normalized direction of a straight line between the initial of first component and the end of second component (dx/dy).
15. Normalized initial direction of second component of signature (dx/dy).
16. Normalized direction of end of signature (dx/dy).
17. Normalized direction of a straight line between the initial of signature the end of signature (dx/dy).
18. Number of dots.
19. Number of components (or number of pen-up).
20. Ratio between the initial time of second component and signature time.
21. Ratio between the writing time in dots and writing time.
22. Ratio between the instance of maximum y and writing time.
23. Ratio between the instance of minimum y and writing time.
24. Ratio between the instance of maximum x and writing time.
25. Ratio between the instance of minimum x and writing time.
26. Number of zero crossing of Vx.
27. Number of zero crossing of Vy.
28. Number of slope changes (4 quadrants).
29. Ratio between total average Vx and maximum Vx.

TABLE 1-continued

Feature Vector Formulas dx = Xmax − Xmin
dy = Ymax − Ymin
tx = total absolute shift in x direction when pen-down
ty = total absolute shift in y direction when pen-down 30. Ratio between total average Vy and maximum Vy.
31. Ratio between minimum Vx and total average Vx.
32. Ratio between minimum Vy and total average Vy.
33. Initial stopping time
34. Ratio between minimum area covering signature and (tx * ty).
35. Ratio between length of signature and minimum area covering signature.
36. Ratio between (Xo − Xmax) and tx.
37. Ratio between (Xo − Xmin) and tx
38. Ratio between (Xend − Xmax) and tx.
39. Ratio between (Xend − Xmin) and tx.
40. Ratio between (Yo − Ymax) and ty.
41. Ratio between (Yo − Ymin) and ty.
42. Ratio between (Yend − Ymax) and ty.
43. Ratio between (Yend − Ymin) and ty.
44. Ratio between [(Xmax − Xmin)/(Ymax − Ymin)] and (tx/ty).
45. Ratio between standard deviation of x and tx.
46. Ratio between standard deviation of y and ty.
47. Ratio between the time duration of slope in quadr 1 (3) and quad 2 (4).
48. Ratio between the writing distances in quad 1 (3) and quad 2 (4).
49. Ratio between time on high curvature and writing time.

Typical numerical values for the features listed in Table 1, above, are illustrated for a number of signatures of the same person in Table 2, below.

TABLE 2

| Feature # | Signature 1 | Signature 2 | Signature 3 | Signature 4 |
|---|---|---|---|---|
| 1 | .9118078 | .924719 | .9252712 | .9117156 |
| 2 | .2311764 | .2148212 | .5289944 | .205608 |
| 3 | .34364 | .3811404 | .3615681 | .3746206 |
| 4 | .4829122 | .5084191 | .4611785 | .4775518 |
| 5 | .3127275 | .3324184 | .3484293 | .2928883 |
| 6 | .4493158 | .4394959 | .5127251 | .486426 |
| 7 | .3523974 | .3768694 | .3944866 | .3628335 |
| 8 | .9999994 | 1 | 1 | 1 |
| 9 | 0 | 0 | 0 | 0 |
| 10 | 0 | 0 | 0 | 0 |
| 11 | .9999994 | 1 | 1 | 1 |
| 12 | .2110926 | .5594009 | .5451636 | .2782975 |
| 13 | 5.460767 | 5.234346 | 5.167385 | 5.300391 |
| 14 | 4.48559 | 4.485213 | 4.478263 | 4.397632 |
| 15 | 6.211878 | .8423321 | .8991112 | .4636476 |
| 16 | 6.056387 | 4.965221 | 4.829627 | 4.877539 |
| 17 | 5.773593 | 5.724953 | 5.558036 | 5.66543 |
| 18 | 0 | 0 | 0 | 0 |
| 19 | 0 | 0 | 0 | 0 |
| 20 | 2 | 2 | 2 | 2 |
| 21 | .6272061 | .6245922 | .6187809 | .6164012 |
| 22 | .5880654 | .5909681 | .5849589 | .5761949 |
| 23 | .1651133 | .1601684 | .1606062 | .1509605 |
| 24 | 1 | 1 | 1 | 1 |
| 25 | .2972161 | .2804188 | .2688982 | .2931568 |
| 26 | 8 | 8 | 9 | 8 |
| 27 | 10 | 9 | 10 | 10 |
| 28 | 11 | 11 | 11 | 11 |
| 29 | .4312726 | .5333911 | .4037018 | .4730115 |
| 30 | .2684414 | .3398632 | .281552 | .3105526 |
| 31 | −3.474905 | −2.964495 | −3.096112 | −2.642645 |
| 32 | −2.128536 | −1.960401 | −2.239379 | −2.313833 |
| 33 | .0442163 | 4.423641E-02 | .033166 | 3.316683E-02 |
| 34 | .12 | .1043097 | 9.056731E-02 | .1136363 |
| 35 | .418932 | .4321038 | .4866297 | .3768831 |
| 36 | −.2266667 | −.2364865 | −.2357143 | −.2375 |
| 37 | .1333333 | .1081081 | .1214286 | .1375 |
| 38 | 0 | 0 | 0 | 0 |
| 39 | .36 | .3445946 | .3571429 | .375 |
| 40 | −.2407408 | −.2054054 | −.1913875 | −.2171718 |
| 41 | 9.259257E-02 | | 9.729726E-02 | 6.220092E-02 |
| 42 | −.1234568 | −7.567555E-02 | | −4.306227E-02 |
| 43 | .2098766 | .2270271 | .2105262 | .222222 |
| 44 | 1.08 | 1.138393 | 1.408356 | 1.237501 |
| 45 | .1026492 | 9.768923E-02 | .1071323 | .1078243 |
| 46 | 6.320256E-02 | | 5.953042E-02 | 5.386533E-02 |
| 47 | .4905248 | .38388 | .5685588 | .6173764 |
| 48 | .2635349 | .2538022 | .2829145 | .2810298 |
| 49 | 3.302321E-02 | | 6.548084E-02 | 9.099068E-02 |

As will be observed, the feature set shown in Table 1, and listed values for these features listed in Table 2, consist of 49 distinct features, most of which are dynamic (i.e., explicitly involve timing information and hence cannot be computed only from an optical image of the recorded (x,y) coordinate pairs). The features are normalized with respect to both time and spatial dimensions. The normalization allows for a degree of inconsistency in both speed and size of a signatory's signature information on file. It is understood that signatures change over time. Thus, the new signature information can be processed according to the inventive method without losing the ability to discriminate against forgery attempts. The time normalization is based on the assumption that at any instant in the signature, an event or writing characteristic will occur at roughly the same fraction of the overall duration of that particular signature, regardless of the overall signing speed. The spatial normalization is based on the assumption that linear scaling of the horizontal and vertical displacements, by possibly different scaling constants, will restore genuine signatures written larger or smaller than the standard size. These normalization procedures are consistent with the goals of real time response and low implementation cost.

After the database is generated by collecting many genuine signatures from each signatory and performing the 49 feature calculations on each digitized signature, a mean value and a standard deviation for each feature is calculated and stored in the reference database 40. If possible, a number of skilled forgeries are deliberately made of each subject's genuine signature, to assist in the identification of, and comparison with, the true signature. However, this procedural step is not necessary in the practice of the inventive method. If forgery data are utilized, the mean value and the standard deviation for each of the 49 features of Table 1, are calculated for the forgery signatures.

A table listing typical mean and standard deviation values for the signature feature data illustrated in Table 2 above, is shown below in Table 3.

TABLE 3

| Feature # | Mean | Standard Deviation |
| --- | --- | --- |
| 1 | .9183784 | 7.64372E-03 |
| 2 | .29515 | .1562544 |
| 3 | .3652423 | 1.654147E-02 |
| 4 | .4825154 | .0195879 |
| 5 | .3216159 | 2.408271E-02 |
| 6 | .4719907 | 3.385128E-02 |
| 7 | .3716467 | 1.823135E-02 |
| 8 | .9999999 | 3.000035E-07 |
| 9 | 0 | 0 |
| 10 | 0 | 0 |
| 11 | .9999999 | 3.000035E-07 |
| 12 | .3984886 | .1797864 |
| 13 | 5.290722 | .1256969 |
| 14 | 4.461675 | .0428279 |
| 15 | 2.104242 | 2.745237 |
| 16 | 5.182194 | .585494 |
| 17 | 5.680503 | 9.285639E-02 |
| 18 | 0 | 0 |
| 19 | 0 | 0 |
| 20 | 2 | 0 |
| 21 | .6217451 | 5.009059E-03 |
| 22 | .5850468 | 6.391102E-03 |
| 23 | .1592121 | 5.937765E-03 |
| 24 | 1 | 0 |
| 25 | .2849225 | 1.285821E-02 |
| 26 | 8.25 | .5 |
| 27 | 9.75 | .5 |
| 28 | 11 | 0 |
| 29 | .4603443 | 5.642055E-02 |

TABLE 3-continued

| Feature # | Mean | Standard Deviation |
| --- | --- | --- |
| 30 | .3001023 | 3.181542E-02 |
| 31 | −3.044539 | .3443837 |
| 32 | −2.160537 | .1536165 |
| 33 | 3.869639E-02 | 6.385466E-02 |
| 34 | .1071283 | .0127834 |
| 35 | .4286371 | .0452689 |
| 36 | −.2340919 | 5.00384E-03 |
| 37 | .1250925 | 1.321302E-02 |
| 38 | 0 | 0 |
| 39 | .3591844 | 1.248771E-02 |
| 40 | −.2136764 | 2.089578E-02 |
| 41 | 8.448728E-02 | 1.558154E-02 |
| 42 | −8.075069E-02 | 3.301507E-02 |
| 43 | .217413 | 8.559261E-03 |
| 44 | 1.216063 | .1437382 |
| 45 | .1038238 | 4.689116E-03 |
| 46 | 5.910805E-02 | 3.871105E-03 |
| 47 | .515085 | .1018839 |
| 48 | .2703204 | 1.404986E-02 |
| 49 | 8.146837E-02 | 4.362095E-02 |

Then, for each feature, the distance between its mean value for the genuine signatures and its mean value for the forgeries is calculated, and these distances are arranged in descending order, as defined hereinbelow with respect to the description of FIG. 6. From this list, a subset of the 49 features is chosen which provides for optimum performance in signature verification, as shown by the feature selection step 34 (FIG. 5).

A typical list of significantly deviating feature data arranged in descending order is shown in Table 4.

TABLE 4

| Preference | Feature # | Distance |
| --- | --- | --- |
| 1 | 42 | 5.014996 |
| 2 | 31 | 4.276094 |
| 3 | 1 | 3.819456 |
| 4 | 14 | 3.810857 |
| 5 | 21 | 3.491306 |
| 6 | 27 | 3.451751 |
| 7 | 17 | 3.450486 |
| 8 | 7 | 3.363345 |
| 9 | 24 | 3.325299 |
| 10 | 10 | 3.312454 |
| 11 | 3 | 3.282605 |
| 12 | 4 | 3.252731 |
| 13 | 12 | 3.240554 |
| 14 | 22 | 3.19276 |
| 15 | 37 | 3.188074 |
| 16 | 40 | 3.185041 |
| 17 | 29 | 3.168796 |
| 18 | 13 | 3.102818 |
| 19 | 28 | 3.077904 |
| 20 | 47 | 3.0084 |
| 21 | 44 | 3.006198 |
| 22 | 8 | 2.979581 |
| 23 | 15 | 2.963951 |
| 24 | 48 | 2.901734 |
| 25 | 46 | 2.82235 |
| 26 | 39 | 2.733701 |
| 27 | 30 | 2.71674 |
| 28 | 36 | 2.664765 |
| 29 | 18 | 2.641038 |
| 30 | 26 | 2.590916 |
| 31 | 6 | 2.578242 |
| 32 | 35 | 2.529578 |
| 33 | 2 | 2.511669 |
| 34 | 45 | 2.467462 |
| 35 | 19 | 2.439759 |
| 36 | 16 | 2.397729 |
| 37 | 34 | 2.374683 |

TABLE 4-continued

| Preference | Feature # | Distance |
|---|---|---|
| 38 | 5 | 2.330088 |
| 39 | 11 | 2.325047 |
| 40 | 25 | 2.312328 |
| 41 | 23 | 1.651252 |
| 42 | 20 | 1.63575 |
| 43 | 41 | 1.587297 |
| 44 | 43 | 1.49759 |
| 45 | 9 | 1.372309 |
| 46 | 32 | 1.279147 |
| 47 | 49 | .9228134 |
| 48 | 33 | .895325 |
| 49 | 38 | .2927308 |

Experimentation has shown that, in the absence of forgery data, which subset of the 49 features to use may be determined by comparing the genuine set of signatures with the genuine signatures of other signatories in the data base, step 36, and that this still provides accurate signature verification, step 38.

Figure 6:
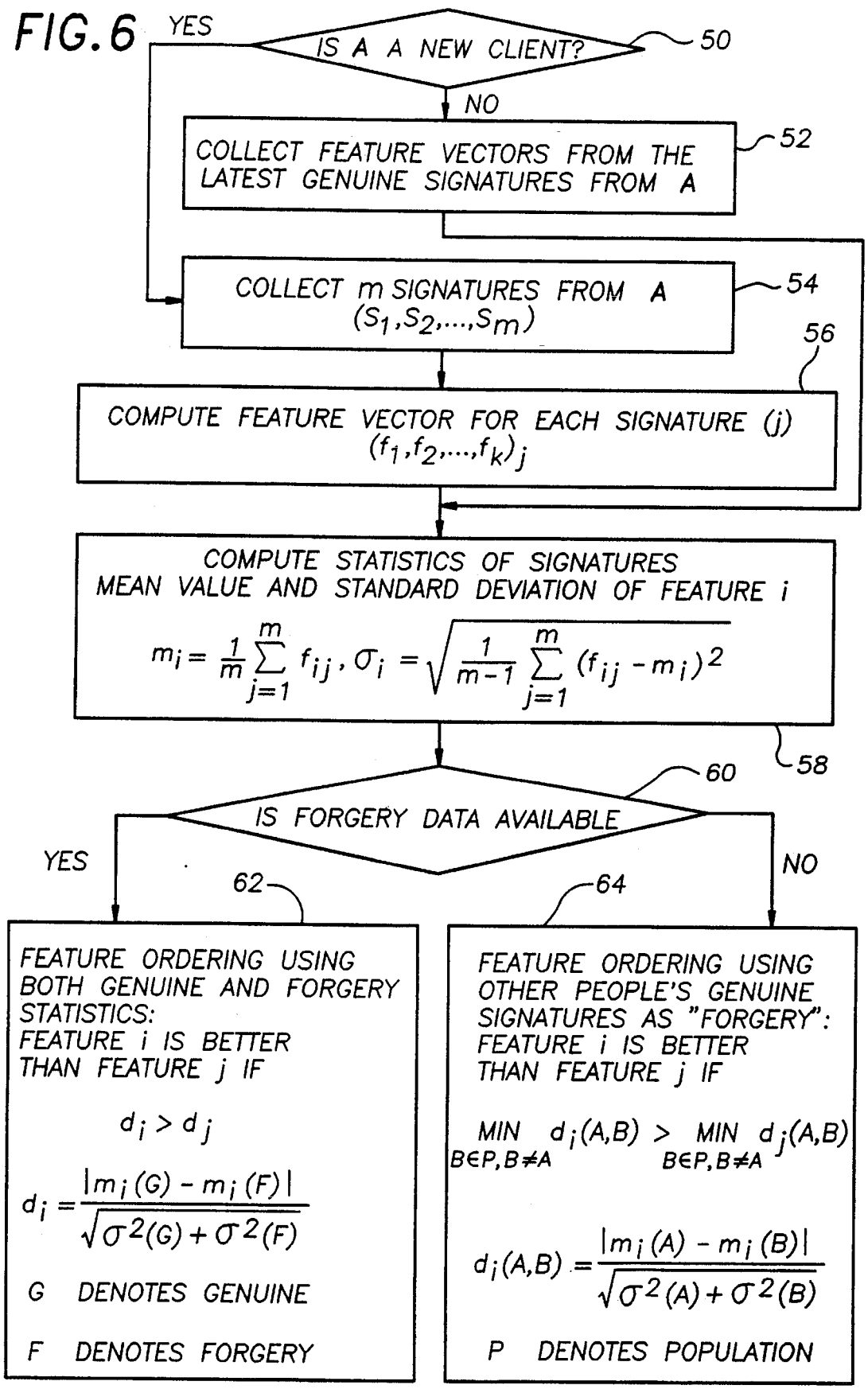
FIG. 6 depicts a flow chart of construction of the reference feature set relating to signature characteristics as utilized in the method of the present invention.

The feature calculations performed in the identification unit 40 and stored in reference database 42 of FIG. 5 are shown in the flow chart of FIG. 6. Decision block 50 of FIG. 6 determines whether or not the signatory is a new client. If not, then in accordance with block 52, feature vectors are collected from the latest "m" number of genuine signatures. According to the process of the invention, as a new signature is added to the calculation, the oldest signature is removed, so that "m" remains constant. This provides for a continual update of the signatory's changing signature over time.

If decision block 50 indicates that this is a new client, then according to block 56, "m" signatures are collected; and the feature vectors are computed for each signature "j".

The next step in the routine in accordance with block 58 computes the mean value and standard deviation for each feature.

Decision block 60 of the program checks if forgery data are available. If so, then according to block 62, for each feature of Table 1 the difference "d" between the mean value of that feature for genuine signatures and its mean for forged signatures is calculated. The features then are ordered according to their d-values, the feature having the largest difference being listed first, block 62. The difference "d" equals the absolute value of the mean of the feature for genuine signature minus its mean for forgeries, which, in the preferred embodiment, is divided by the square root of the sum of the squares of the standard deviations of the genuine and forged signature feature values.

It should be understood that other normalizations are possible to define the difference "d" (Table 4). The subset of features is then established typically by using the top ten, or so, features having the greatest difference "d". The scope of this invention is not necessarily limited to using ten independent, equally weighted features. For example, certain features may be eliminated if they correlate heavily with features already used.

If no forged data are available, then block 64 simulates forgeries by using other subjects' genuine signatures for the calculation for selecting the feature subset. Block 64 indicates that the routine assumes the subset of features is for verifying A's signature (the true signatory). Stored in database 40 are genuine signatures of a population "P". The differences between the feature's value for the genuine signatures of A and for each of several genuine signatures B among population "P" are computed. The closest match (i.e., the minimum difference between the values of this feature for any such A and B), then plays the role of "d" when assessing the feature's usefulness for discriminating genuine signatures of A from imitations thereof.

A major benefit of the present invention's feature selection algorithms is that they provide the capability for immediate update of reference features, thereby making the verification system adaptive to both long term and short term variation in people's genuine signatures.

In addition, the inventive method provides a system having low cost and high speed in selecting a common feature set for every signatory. Experimental results indicate that the common feature set shows only small degradations in rejection capability in comparison to the cases in which the verification system uses, for each subject, his or her individually optimized subset of features.

Figures 9, 10:
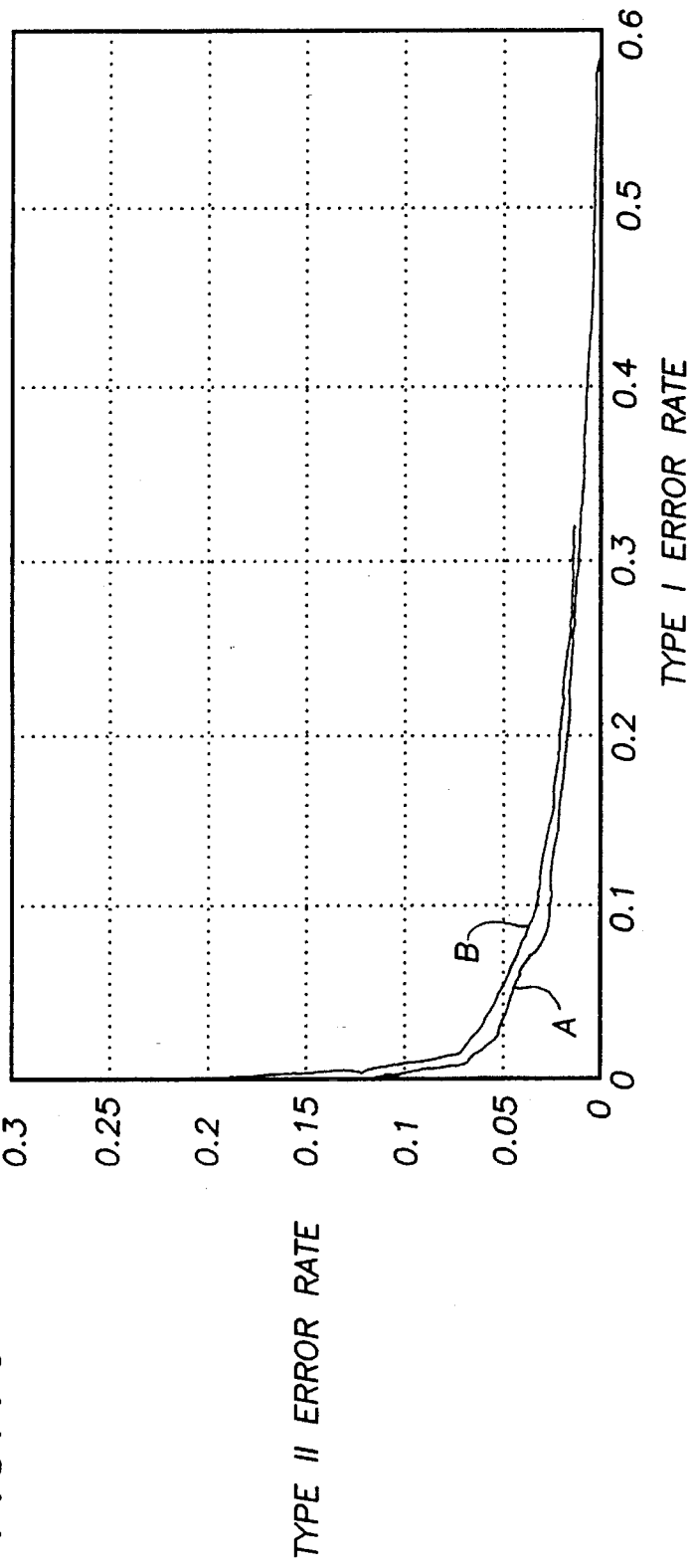
FIG. 9 shows a diagram of typical samples of genuine signatures by one signatory, named Lee, used in the description of the method of the present invention.
FIG. 10 depicts the Type I vs. Type II error trade-off for majority classifiers using individualized features in a common set of signature features in accordance with the method of the present invention.

FIG. 10 depicts the Type I vs. Type II error trade-off for majority classifiers using ten individualized features (Curve A) and using a common set of ten features (Curve B). In other words, the curves illustrate trade-offs between rejecting a valid signature versus accepting a forged or invalid signature.

The common set therefore contains features which are good for distinguishing virtually every subject's genuine signature from a forgery. Note the curves reflect the ten most significant features.

Now referring again to FIG. 5, the overall process of operation, utilizing the verifier in the field on a candidate signature, is depicted in a second phase of operation. The identification unit 42 informs the reference database 40 of the identity of the alleged signatory via inputting of a PIN and/or data obtained by swiping the credit (debit) card through a magnetic strip reader. Signature data acquisition 30 includes the digitizer 2 which is responsive to the written signature. A series of dots is generated along the signature curve, each having an X and Y coordinate with respect to time (T).

A typical table of X, Y, and T values for a signature "i" is shown below in Table 5 The −1 entries there signify the "pen up" condition, and the −2 entries signify the end of the signature.

TABLE 5

| Ti | Xi | Yi | Ti | Xi | Yi | Ti | Xi | Yi |
|---|---|---|---|---|---|---|---|---|
| 0 | 96 | 397 | .3638102 | 79 | 410 | .8682663 | 113 | 42 |
| 1.104946E-02 | 96 | 397 | .3748797 | 80 | 411 | .879335 | 116 | 42 |
| 2.209809E-02 | 96 | 398 | .3859292 | 81 | 413 | .8903845 | 118 | 41 |
| 3.316683E-02 | 96 | 398 | .3996748 | 83 | 416 | .9041293 | 119 | 41 |
| 4.421714E-02 | 96 | 399 | .4107234 | 85 | 419 | .8602541 | 120 | 41 |
| 5.528587E-02 | 97 | 400 | .421793 | 87 | 421 | .9262291 | 120 | 41 |
| 6.633534E-02 | 98 | 401 | .4328425 | 90 | 422 | .9372978 | 120 | 40 |
| 7.738397E-02 | 99 | 402 | .4438919 | 93 | 423 | .9483464 | 119 | 40 |

TABLE 5-continued

| Ti | Xi | Yi | Ti | Xi | Yi | Ti | Xi | Yi |
|---|---|---|---|---|---|---|---|---|
| .0884527 | 100 | 402 | .4549599 | 96 | 422 | .9594152 | 118 | 41 |
| 9.950049E-02 | 101 | 402 | .4660093 | 98 | 421 | .9704655 | 117 | 41 |
| .1105692 | 103 | 401 | .4770789 | 101 | 419 | .9878182 | 116 | 41 |
| .1216187 | 105 | 399 | .4881284 | 103 | 416 | .998887 | 115 | 42 |
| .1326682 | 107 | 397 | .499177 | 106 | 412 | 1.009936 | 116 | 42 |
| .1437168 | 110 | 394 | .5102264 | 107 | 409 | 1.020985 | 118 | 42 |
| .1547847 | 111 | 391 | .5212952 | 107 | 407 | 1.032053 | 121 | 42 |
| .1658526 | 112 | 389 | .532343 | 106 | 406 | 1.043102 | 124 | 42 |
| .1769021 | 112 | 388 | .5434117 | 105 | 406 | 1.054151 | 127 | 42 |
| .1879515 | 112 | 387 | .5544612 | 103 | 407 | 1.06522 | 130 | 41 |
| .199001 | 112 | 387 | .5655098 | 101 | 410 | 1.076269 | 132 | 41 |
| .210068 | 108 | 393 | .5765786 | 99 | 415 | 1.087336 | 133 | 41 |
| .2211175 | 104 | 397 | .5876263 | 95 | 422 | 1.098386 | 133 | 41 |
| .2321854 | 101 | 401 | .5986951 | 92 | 429 | 1.109434 | 132 | 41 |
| .2432349 | 95 | 409 | .6308277 | 89 | 437 | 1.120503 | 131 | 41 |
| .2643105 | 90 | 413 | .6339245 | 89 | | 1.131553 | 129 | 41 |
| .2753792 | 86 | 415 | −1 | −1 | −1 | 1.14262 | 129 | 41 |
| .2864287 | 83 | 416 | .790884 | 104 | 427 | 1.153669 | 129 | 42 |
| .2974773 | 81 | 416 | .8019326 | 104 | 427 | 1.188692 | 130 | 42 |
| .3085268 | 79 | 413 | .8130006 | 104 | 427 | 1.191787 | 130 | 42 |
| .3195938 | 78 | 411 | .8240492 | 105 | 427 | −1 | −1 | −1 |
| .3306433 | 79 | 410 | .8350986 | 106 | 427 | −2 | −2 | −2 |
| .3417121 | | | .8461481 | 108 | 426 | | | |
| .3527615 | | | .8572168 | 110 | 426 | | | |

The data from signature data acquisition 30 are received, and feature extraction 32 is accomplished. Then each of the 49 features is calculated and sent to database 40. These new signature features will update the database 40 if the signature is successfully verified.

Feature selection 34 receives from reference database 40 the optimal or nearly-optimal subset for the individual in question. Reference database 40 also sends the reference values of the features in that set to comparison unit 36 in the form of mean values and standard deviations. Comparison unit 36 also receives from feature selection unit 34 the values of the selected features for the candidate signature. If a common feature set rather than an individualized feature set is employed, then it is the reference values of the features in the common set for the individual in question and the common feature values for the candidate signature that are sent to comparison unit 36.

For each selected feature number "i" the calculated feature value $t_i$ from feature selection 34 is used in block 82 of the flow chart of FIG. 8 to compute the difference $r_i$. Then $r_i$ is compared to threshold $\alpha_i$ in comparison step 36, according to decision block 85, shown in FIG. 8.

Decision making step 38 declares the signature genuine if the number of features successfully matched is in the majority (i.e., if more than half of the features successfully passed the test of block 88). It should be understood that fractions other than ½ could be used resulting in a modified "majority" classifier. The decision to make the test more or less stringent can be related to the degree of the transaction. That is, transactions for exceptionally large sums of money or merchandise may require a higher standard.

If the signature is verified, decision making step 38 will include the issuance of a confirmation signal, granting permission for database 40 to be updated with the 49 features received from feature extraction step 32.

Figure 7:
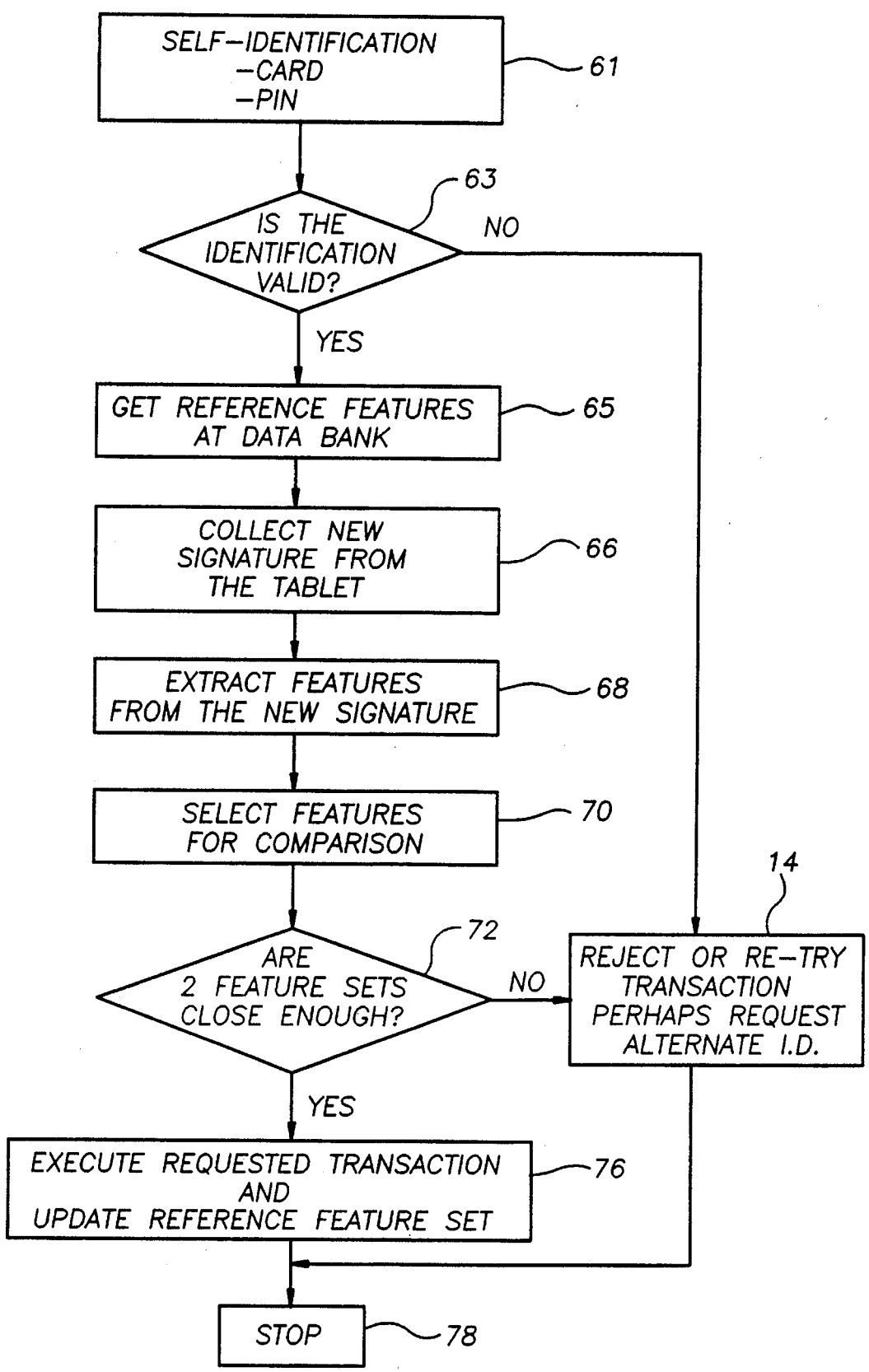
FIG. 7 illustrates a flow chart of the signature verification method of the current invention.

Referring to FIG. 7, a flow chart routine of the signature verification process is illustrated. Block 61 indicates the receipt of the information of the magnetic stripe of a credit card and/or the PIN number of the signatory. Decision block 63 calls for the test for a valid identification.

If the identification is invalid, then in accordance with the step of block 74, the information is rejected, and an alternate I.D. is requested (a retry). After a certain number of retries, the process may be allowed to enter a blocking mode.

If the identification is valid, a signatory address is generated for retrieval of information in the database containing the signatory's information file. The reference features of the signatory signature are fetched (block 65) from the reference database 40 (FIG. 5). In accordance with block 66, the next step in the process collects the new signature data from the digitizer 2. The features from the new signature are extracted, block 68. Features for comparison are then selected, block 70. Decision block 72 of the routine determines whether the two feature sets are within the threshold limits. If not, then the transaction is rejected, block 74. If the signature is valid, however, the routine executes the transaction and updates the reference feature set of database, block 76. Accordingly, the routine ends after verification, block 78.

Referring to FIG. 8, a flow chart of the adaptive majority decision algorithm is illustrated, which compares the value of each feature of the signature being verified against the mean and standard deviation of the corresponding feature from the reference database.

Values are established of the variables, block 80. As an example, the number of features "N" equals 10; the mean value of feature 42 is −0.076 from Table 6 (shown and described herein); the standard deviation is 0.009; the feature value is −0.078 from Table 7 (shown herein); and the decision threshold $\alpha$ is assumed at 1.5. (Three significant places are used for simplification.)

Block 82 illustrates the step of testing N features. In this example N is assumed to be 10. Calculating for the value of $r_i$ for feature 42 in this instance gives the value (−0.076+0.078)/0.009=0.2 for the genuine signature and the value (−0.12+0.078)/0.009=4.7 for the forgery data listed in Table 8. Since the value of $\alpha$ equals 1.5, feature 42 is below the threshold for the genuine signature and above it for the forgery, thereby contributing to correct decisions. Block 84 depicts the step wherein a successful feature is given a weight of "1". If distance $r_i$ is not less than or equal to threshold $\alpha_i$ (block 85), then according to block 86, a failed feature is given a weight of "0".

TABLE 6

| Feature # | Mean | Standard Deviation |
| --- | --- | --- |
| 1 | .9075852 | 1.696403E-02 |
| 2 | 1.030657 | .1389547 |
| 3 | .18337 | .0376654 |
| 4 | .3752729 | 1.821593E-02 |
| 5 | .190745 | .0154339 |
| 6 | .3459289 | 2.886085E-02 |
| 7 | .3309298 | 3.149301E-02 |
| 8 | .8201063 | .116565 |
| 9 | .1647848 | .0968743 |
| 10 | .8556273 | 3.873384E-02 |
| 11 | .1436401 | 3.829394E-02 |
| 12 | 4.501171 | 4.277185E-02 |
| 13 | 5.138044 | .1196821 |
| 14 | 5.399023 | .3415712 |
| 15 | 5.487131 | .753388 |
| 16 | 1.024974 | .149071 |
| 17 | 6.055625 | 6.626433E-02 |
| 18 | .98 | .2 |
| 19 | 1.986553E-02 | 4.096243E-03 |
| 20 | 4.85 | .4793725 |
| 21 | .158424 | 1.899458E-02 |
| 22 | .9452538 | 6.164291E-03 |
| 23 | .6107979 | .3140808 |
| 24 | .9992357 | 2.606153E-03 |
| 25 | 4.314549E-02 | 9.174258E-03 |
| 26 | 20.26 | 1.418635 |
| 27 | 37.02 | 3.228597 |
| 28 | 37.21 | 3.607778 |
| 29 | .1284507 | 3.277882E-02 |
| 30 | .1793234 | 2.252192E-02 |
| 31 | −5.296223 | .811462 |
| 32 | −6.157446 | 1.964109 |
| 33 | 5.307208E-02 | 5.566087E-02 |
| 34 | 6.197253E-02 | 4.943863E-03 |
| 35 | .2384992 | 1.795697E-02 |
| 36 | −.442185 | 2.257813E-02 |
| 37 | 4.475126E-02 | 6.106759E-03 |
| 38 | −2.011569E-04 | 6.871736E-04 |
| 39 | .486735 | 2.213769E-02 |
| 40 | −.1025828 | 1.087958E-02 |
| 41 | .0247685 | 6.457562E-03 |
| 42 | −7.569315E-02 | 9.008386E-03 |
| 43 | 5.165822E-02 | 7.40189E-03 |
| 44 | 3.845938 | .3521031 |
| 45 | .1404728 | 7.555238E-03 |
| 46 | 1.930775E-02 | 1.048911E-03 |
| 47 | .8157333 | .109786 |
| 48 | .5463182 | 1.699232E-02 |
| 49 | 3.694507E-02 | 1.807648E-02 |

TABLE 7

| Feature # | Test | Feature Value |
| --- | --- | --- |
| 42 | 1 | −7.840233E-02 |
| 31 | 1 | −5.570047 |
| 1 | 0 | .83023 |
| 14 | 0 | .1742807 |
| 21 | 0 | .1949008 |
| 27 | 1 | 36 |
| 17 | 1 | 6.119486 |
| 7 | 1 | .2907212 |
| 24 | 1 | 1 |
| 10 | 1 | .8961567 |
| 3 | 1 | .1902728 |
| 4 | 0 | .4026323 |
| 12 | 0 | 4.615605 |
| 22 | 0 | .9637462 |
| 37 | 0 | 2.850356E-02 |
| 40 | 1 | −9.911239E-02 |
| 29 | 1 | .1490496 |
| 13 | 1 | 5.284423 |
| 28 | 0 | 30 |
| 47 | 0 | .5750346 |
| 44 | 1 | 3.675272 |

TABLE 7-continued

| Feature # | Test | Feature Value |
| --- | --- | --- |
| 8 | 1 | .8961567 |
| 15 | 1 | 5.56134 |
| 48 | 0 | .4027903 |
| 46 | 1 | .0197869 |
| 39 | 1 | .4893112 |
| 30 | 1 | .1559448 |
| 36 | 1 | −.4608076 |
| 18 | 1 | 1 |
| 26 | 1 | 21 |
| 6 | 0 | .3005011 |
| 35 | 1 | .2383131 |
| 2 | 1 | 1.177209 |
| 45 | 1 | .1375827 |
| 19 | 1 | 1.818334E-02 |
| 16 | 1 | .9769109 |
| 34 | 1 | 6.514495E-02 |
| 5 | 1 | .2010348 |
| 11 | 1 | .1038433 |
| 25 | 1 | 5.481618E-02 |
| 23 | 1 | .6752737 |
| 20 | 1 | 5 |
| 41 | 1 | 3.402364E-02 |
| 43 | 1 | 5.473372E-02 |
| 9 | 1 | .1038433 |
| 32 | 1 | −6.409507 |
| 49 | 0 | 7.360902E-02 |
| 33 | 0 | .1437227 |
| 38 | 1 | 0 |

A final decision is made in block 88. If fewer than half of the tested features failed (i.e., less than half had a weight of "0"), then the routine indicates (block 90) that the tested signature is genuine; otherwise the signature is rejected, block 92.

Figure 8A:
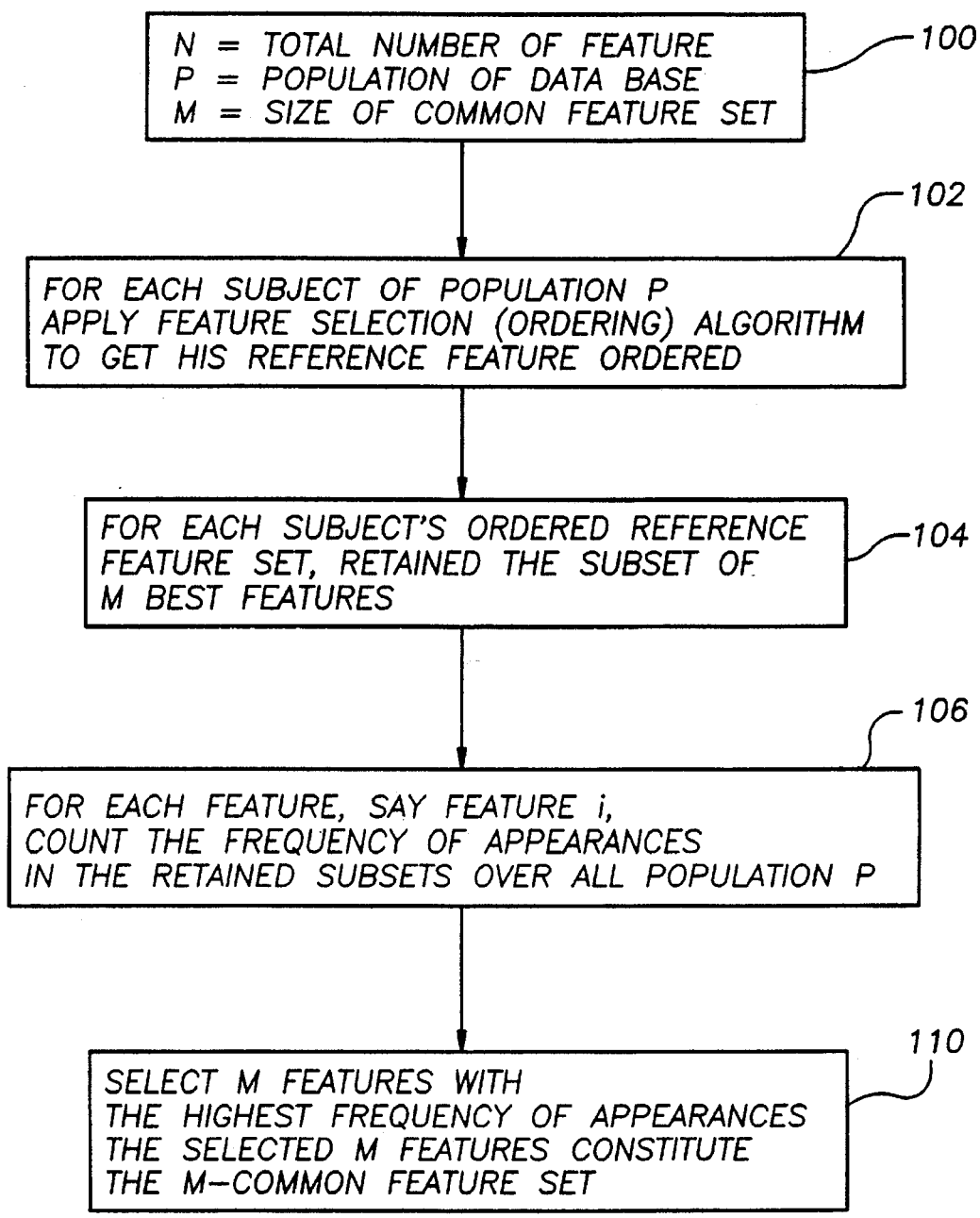
FIG. 8a illustrates a flow chart of the common feature selection algorithm used in the method of the present invention.

FIG. 8a illustrates a flow chart of the common feature selection algorithm that uses common features of the signatory's signature. Block 100 indicates that a selection is made of the terms used to develop the common set of features, wherein N equals the total number of features, typically the features of Table 1; P equals the total population of the data base stored in database 40 (FIG. 5); and M equals the size of the common feature set.

Block 102 has the routine applying the feature selection algorithm of FIG. 6 for each subject of population P to order that signatory's reference feature set in a manner similar to that of Table 4.

In accordance with block 104, for each subject a subset of M best features having the greatest distance d is retained. Thereafter, the number of appearances of each feature in all of the retained subsets is counted, block 106.

Block 108 indicates that the M features with the highest frequencies of appearance are selected.

Block 110 illustrates that the selected M features are then stored as the common feature set.

FIG. 9 shows four genuine signatures written by a certain Mr. Lee for whom the data were gathered.

Table 5 (as previously illustrated herein) lists the X, Y and T coordinates of each point of one of the signatures of this FIG. 9. Table 2 illustrates the list of the 49 feature calculations from the four genuine samples of the signatures of FIG. 9. Four sets of data, corresponding to each of Mr. Lee's signatures, are used for the calculations. Table 3 lists the mean and standard deviation from this data for each of the 49 features of Table 2.

Table 7, above, illustrates an example of successful verification calculations for a genuine signature, in accordance with the procedure set forth in FIG. 8. The top ten features have a test result of seven "1's" indicating passing features, and three "0's" indicating failing features. The signature will pass if the number of "1's" equals or exceeds the number of "0's".

Table 8 illustrated below shows an example of rejection calculations for a forgery in accordance with the procedure shown in FIG. 8. The top ten features have a test result of seven "0's" indicating a forgery.

TABLE 8

| Feature # | Test | Feature Value |
|---|---|---|
| 42 | 0 | −.1224106 |
| 31 | 0 | −3.745729 |
| 1 | 0 | .7620077 |
| 14 | 0 | 4.442641 |
| 21 | 0 | 6.840176E-02 |
| 27 | 0 | 28 |
| 17 | 0 | 6.191979 |
| 7 | 0 | .208143 |
| 24 | 1 | 1 |
| 10 | 0 | .6780675 |
| 3 | 1 | .1655434 |
| 4 | 0 | .3102922 |
| 12 | 1 | 4.526063 |
| 22 | 1 | .9467545 |
| 37 | 0 | 3.206997E-02 |
| 40 | 0 | −.1374764 |
| 29 | 1 | .1340287 |
| 13 | 0 | 4.397906 |
| 28 | 0 | 27 |
| 47 | 1 | .7706682 |
| 44 | 0 | 3.079564 |
| 8 | 1 | .7200066 |
| 15 | 1 | 5.852825 |
| 48 | 0 | .6872349 |
| 46 | 0 | 2.688886E-02 |
| 39 | 0 | .5393586 |
| 30 | 0 | 9.751211E-02 |
| 36 | 0 | −.5072886 |
| 18 | 1 | 1 |
| 26 | 1 | 21 |
| 6 | 0 | .2461803 |
| 35 | 1 | .2382241 |
| 2 | 0 | 1.28137 |
| 45 | 0 | .1599589 |
| 19 | 1 | 1.985369E-02 |
| 16 | 1 | 1.134063 |
| 34 | 0 | 9.446394E-02 |
| 5 | 0 | .1618257 |
| 11 | 0 | .2799934 |
| 25 | 0 | 7.435918E-02 |
| 23 | 1 | .5265246 |
| 20 | 0 | 11 |
| 41 | 0 | 3.766479E-02 |
| 43 | 1 | 5.273068E-02 |
| 9 | 1 | .2482301 |
| 32 | 1 | −8.659429 |
| 49 | 1 | 4.079828E-02 |
| 33 | 0 | .3675388 |
| 38 | 1 | 0 |

While the invention has been shown and described with reference to the preferred embodiment thereof, it will be understood by those skilled in the art that the above and other changes in form and detail may be made therein without departing from the spirit and scope of the invention.

Having thus described the invention, what is desired to be protected by Letters Patent is presented by the subsequently appended claims.

What is claimed is:

1. A signature verification system comprising:
    digitizer means for digitizing a signature of a signatory whose signature is to be verified, said digitizer means having a pad upon which said signatory can write or otherwise scribe a signature to be converted into digital data; and
    a computer, operatively connected to said digitizer means for receiving said digital data, said computer having storage means for storing digital data and information, including a database comprising sets of features relating to a plurality of previously entered signatory signatures, wherein said database includes a set of feature values for each signature and each feature value represents a mean value and a standard deviation value for the corresponding feature calculated from a plurality of signatures of a signatory, both said mean values and said standard deviation being used to verify said signature, said computer having a program and:
        a) means for acquiring said digital data from said pad;
        b) means for generating a set of feature values based upon said acquired digital data, a portion of said set of features being values having a time variable relating to when a portion of said digital data of said signature was made;
        c) means for selecting feature values of said acquired and stored digital data for comparison; and
        d) means for making a verification decision with respect to said signature based upon comparison of said selected feature values including establishing a decision verification threshold, said verification decision updating said database-selected feature values when a current signature is verified.

2. The signature verification system of claim 1, wherein said computer, in response to contact with a stylus or writing instrument used by said signatory when writing or otherwise scribing said signature, generates a sequence of digits related to said signature, each digit being ascribed a horizontal coordinate (X) and a vertical coordinate (Y), and further wherein said computer generates a set of features of said signature comprising a portion that relates coordinated digits of said sequence of digits with respect to time (T).

3. The signature verification system of claim 2, wherein said computer verifies a signature when at least a predetermined number of said set of selected feature values are successfully compared.

4. The signature verification system of claim 3, wherein said predetermined number of said set of selected feature values is at least one half of the number of selected feature values in said set.

5. The signature verification system of claim 1, further comprising signature address generating means operatively connected to said digitizer means and to said computer for generating a signatory address for accessing signature data in said storage means relating specifically to a current signature being written or otherwise scribed upon said pad of said digitizer means.

6. The signature verification system of claim 5, wherein said signature address generating means includes a keyboard for entering a PIN number of said signatory.

7. The signature verification system of claim 6, wherein said signature address generating means further includes a magnetic stripe reader for ascertaining said signatory identity from a magnetic stripe disposed upon a card.

8. The signature verification system of claim 5, wherein said signature address generating means includes a magnetic stripe reader for ascertaining said signatory identity from a magnetic stripe disposed upon a card.

9. The signature verification system of claim 1, further comprising a data link disposed between said pad of said digitizer means and said computer.

10. The signature verification system of claim 9, wherein said digitizer means comprises a portable unit.

11. A method of developing a reference database of values from signatures of a signatory for the purpose of subsequent signature verification of said signatory, including the steps of:

a) digitizing a plurality of signature, "m", of a signatory to provide digitized data;

b) normalizing said digitized data;

c) generating a set of feature values derived from said digitized data of said signatory, wherein each digit of said digitized data having been ascribed a horizontal coordinate (X) and a vertical coordinate (Y), further is related in sequence of said digits with respect to time (T), and wherein said feature values comprise relationships between (X) and (Y) digital information with respect to time;

d) deriving a mean value for each feature value of said set of feature values, calculated for "m" signatures of said signatory;

e) deriving a standard deviation value for each feature value of said set of feature values, calculated for "m" signatures of said signatory;

f) storing the derived values of steps (d) and (e) in a reference database for comparison with a subsequent signature allegedly of said signatory for signature verification purposes;

g) digitizing a current signature of said signatory;

h) generating a set of feature values for said current signature;

i) comparing the set of feature values for said current signature to the stored mean and standard deviation values for said signatory to determine if said current signature is valid; and j) updating said stored mean and standard deviation values using the current signature feature values, when it is determined that said current signature is valid.

12. The method of developing a reference database of values from signatures of a signatory, in accordance with claim 11, further comprising the step of:

k) selecting a subset of feature values and storing said subset of feature values in said database, said subset of feature values including features whose values are distributed within a substantially small range of the standard deviations around characteristic mean values that are indicative of a true signature of said signatory.

13. The method of developing a reference database of values from signatures of a signatory, in accordance with claim 12, further comprising the steps of:

l) digitizing a plurality of forged signatures;

m) generating a set of feature values derived from said forged signatures;

n) deriving a mean value for each feature value of said set of feature values derived from said forged signatures; and o) deriving a standard deviation value for each feature value of said set of feature values derived from said forged signatures.

14. The method of developing a reference database of values from signatures of a signatory, in accordance with claim 13, further comprising the step of:

p) for each feature, calculating the standardized distance between said mean value for each feature value of said set of feature values for "m" signatures of said signatory, and said mean value for each feature value of said set of feature values derived from said forged signatures.

15. The method of developing a reference database of values from signatures of a signatory, in accordance with claim 14, further comprising the step of:

q) arranging said calculated distances in a predetermined order.

16. The method of developing a reference database of values from signatures of a signatory, in accordance with claim 15, wherein said predetermined order is descending.

* * * * *